United States Patent [19]

Grisé et al.

[11] 4,085,333
[45] Apr. 18, 1978

[54] CONSERVATION OF ELECTRICAL ENERGY

[76] Inventors: Frederick G. J. Grisé, 87 Main St., Osterville, Mass. 02655; Walter Lovell, 348 Mountain Rd., Wilbraham, Mass. 01095

[21] Appl. No.: 658,698

[22] Filed: Feb. 17, 1976

[51] Int. Cl.² .............................................. F02C 7/02
[52] U.S. Cl. ...................................... 290/2; 219/300; 219/302; 60/652; 60/659
[58] Field of Search ............... 290/2, 52; 60/652, 659; 219/300–302; 126/400; 237/12.1

[56]  References Cited

U.S. PATENT DOCUMENTS

| | | | |
|---|---|---|---|
| 3,270,182 | 8/1966 | Hynes | 219/300 |
| 3,681,920 | 8/1972 | Margen | 60/652 |
| 3,848,416 | 11/1974 | Bundy | 60/652 |
| 3,886,749 | 6/1975 | Pacault | 60/652 |
| 3,891,860 | 6/1975 | Hutarew | 290/52 |

Primary Examiner—Robert K. Schaefer
Assistant Examiner—John W. Redman
Attorney, Agent, or Firm—Charles R. Fay

[57] ABSTRACT

In an electric generator capable of producing surplus electrical energy at certain periods, that improvement which comprises utilizing the surplus electrical energy to directly heat an electricity conducting heat storing magma, the magma having passages therethrough for the selective reception of water producing steam during high demand or low energy producing periods to increase the total production of electrical energy.

17 Claims, 4 Drawing Figures

4,085,333

CONSERVATION OF ELECTRICAL ENERGY

BACKGROUND OF THE INVENTION

It is an important consideration to preserve energy and particularly electrical energy. It is the object of the present invention to conserve electrical energy so that surplus electrical energy available at off peak hours or during bright sun or high wind conditions, is utilized for providing extra energy during peak demand periods or at sunless or windless conditions, with no pollution problem regardless of the source of the surplus electricity.

SUMMARY OF THE INVENTION

In a generating plant of usual construction, the provision of a heat retaining module of magma material which directly changes electrical energy into heat and retains it, examples of which are ceramics, sintered material, aggregates whether concrete or discrete, but all having electrical conductive properties. There are poles inserted directly into the magma receiving electrical energy at relatively high voltages from a conventional generator utilizing surplus electrical energy to heat the magma. The invention also includes the provision of a separate generator for electrical energy which is adapted to be driven by steam generated by the module, when electric energy is in demand, by flowing water or water spray into passages extending through the magma whereby the water is changed into steam and/or super heated steam conducted to the supplementary generator which then generates extra power which otherwise would have been wasted. Surplus solar or wind produced electric energy can also be thus saved, and the steam can be used in some cases to help drive the original generator. Conducting materials may include carbon.

PREFERRED EMBODIMENT OF THE INVENTION

Figure 1:
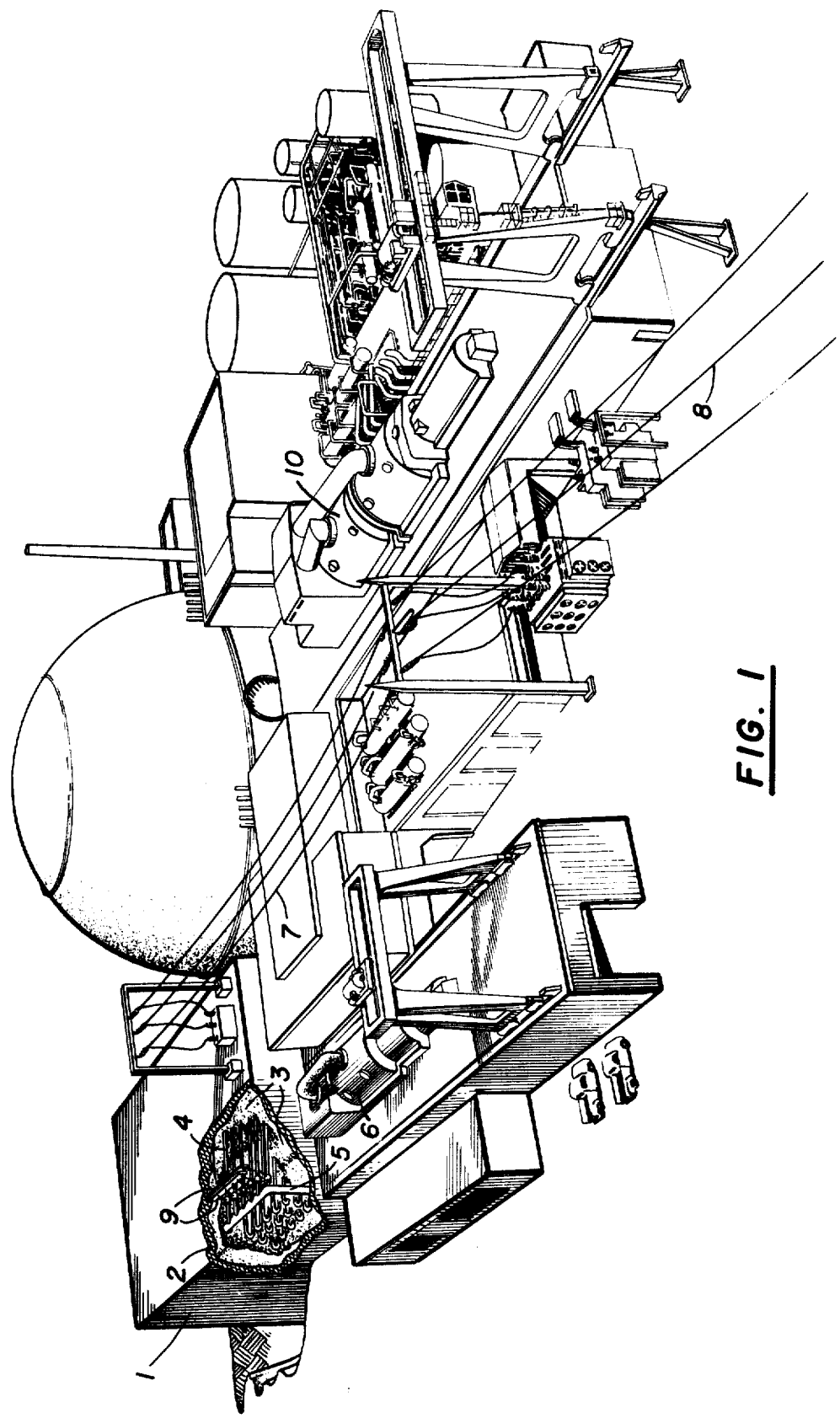
FIG. 1 is a perspective view illustrating the entire system.

Referring to FIG. 1, the main parts of the apparatus are herein illustrated in conventional form. The reference numeral 1 indicates a module or series of modules which may be referred to as apparatus for heat storage and steam converting. The module or series of modules are insulated as indicated at 2 and are of electricity conducting and heat retaining magma material, as indicated at 3. This material will be described hereinafter. A series of passages as indicated at 4 extend generally throughout the module and these serve to conduct water or spray through the module to convert heat stored in the module into steam which is directed to the steam header 5 which in turn drives the auxilliary generator 6, or which can be directed to help drive the conventional generator.

The reference 7 indicates power lines from the conventional generator to the module; the reference 8 indicates the usual power lines, and of course such necessary switches and safety devices are present as will be apparent to those skilled in the art.

Where an auxilliary generator is used, the system can be remote, and this has advantages in flexibility of system design.

The conventional generator is indicated at 10 and need not be further described because of the fact that it is well-known in the art, as are the power lines 8 which lead out to transformers, substations, etc., ffor consumer use, while the power line 7 heats module material 3 during off peak hours only through a diverter switch.

The passage 4 conducts the water or spray from any source or supply not indicated when steam is needed to generate electricity by the supplementary generator 6, and the electricity from this generator 6 may be conducted into the system, as to line 8, by any desired or necessary connections.

The passages 4 may be simply elongated openings formed through the material 3, or they may be burnished therein to provide slick sides, or they may actually be provided with piping or coated with porcelain, etc.

Figure 2:
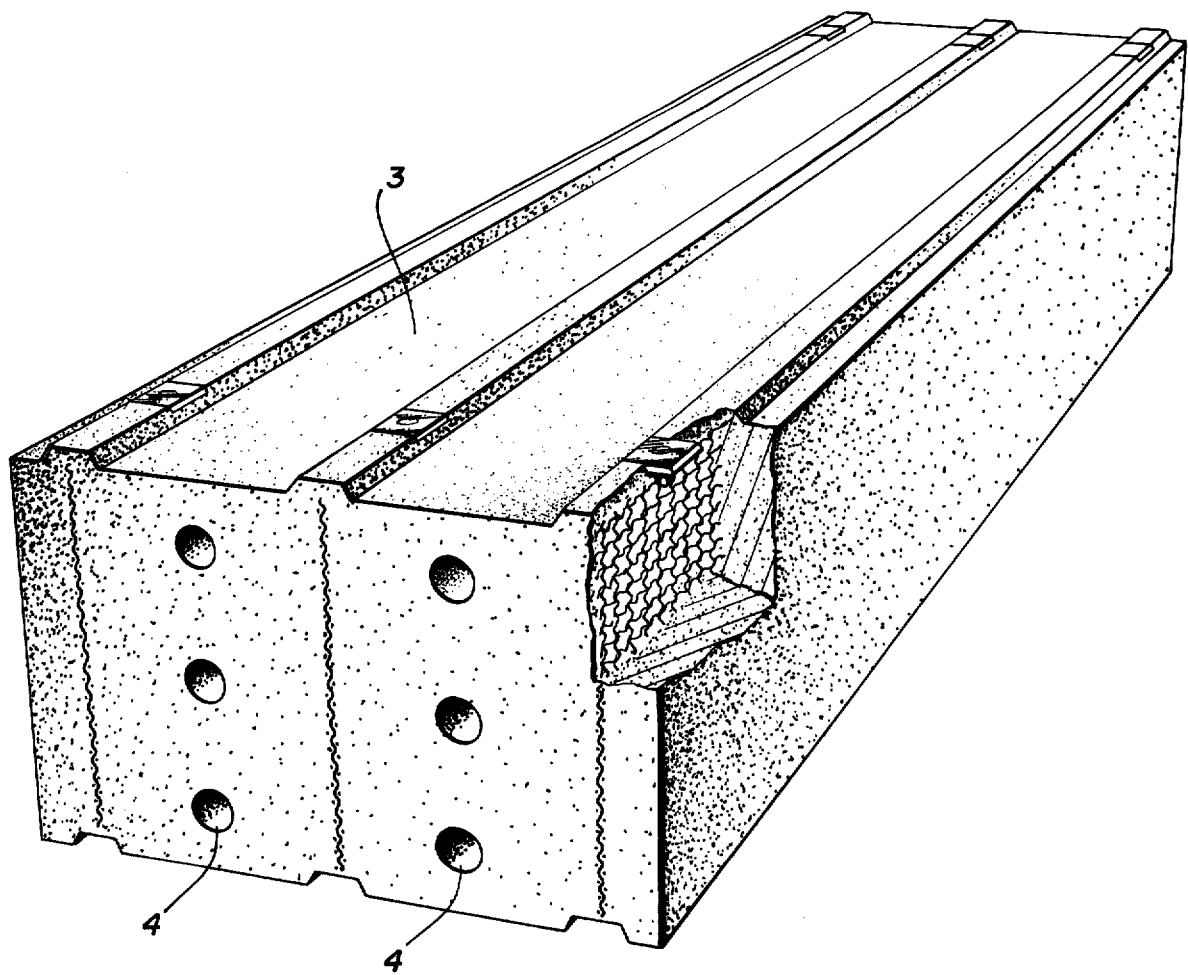
FIG. 2 is a perspective view illustrating the module for storing heat and converting it to steam.

Referring now to FIG. 2, a single module is here shown. There may be of course as many of these modules as may be useful or necessary in the design of the particular system at hand. In any event the material 3 may be a cementitious aggregate whether concrete or discrete provided with some kind of material, e.g. carbon, dispersed throughout to allow for a flow of electricity therein between the electrodes as indicated in the material 3. Ceramic materials can be used, as well as sintered materials and such material is herein referred to as "magma".

The magma material is of high specific heat and specific weight and has great capacity for storing heat in large quantities. It can take on heat as described above at a great rate of speed. The electrodes may be screens which in this case extend parallel to each other and extend throughout each module so that the current flows by the granules of the magma simultaneously. Thus the module takes on heat very quickly and the transfer of the heat does not depend on conduction, radiation or convexion to any significant extent.

The passages receive the water or spray and draw heat from the magma, converting the liquid to steam for transmission to the steam header 5, thence to e.g. the generator 6 for feeding back electric energy during high electricity demand periods. This electric energy has therefore been saved from the surplus provided whether at off peak hours or because of unneeded sunlight, wind, etc. for generators so powered. Therefore, it will be seen that the present apparatus is in the first place very saving of electrical energy, and also provides this saving without any kind of pollution problem.

During periods of balanced consumption between supply and demand and new energy conservation system will be in off position with no input to the storage area nor any output from the storage area.

Figure 3:
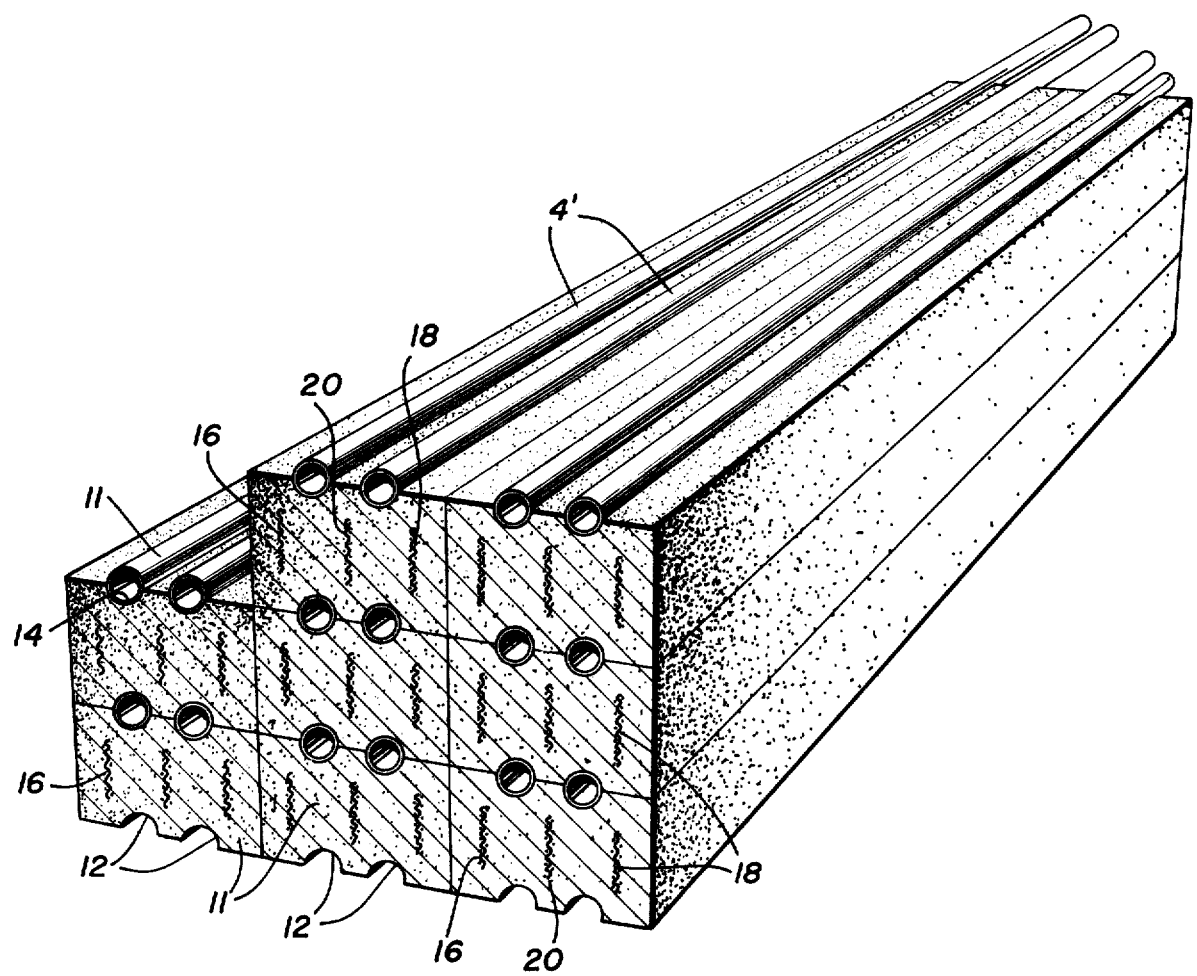
FIG. 3 is a perspective view showing a modified form of the module.

FIG. 3 shows a built up module of magma where blocks 11 are premolded with longitudinal grooves therein as at 12 and 14 and these may be stacked up as shown either with or without pipes 4' laid in the grooves. In this kind of module the electrodes are molded into the blocks as indicated at 16, 18 and 20.

Figure 4:
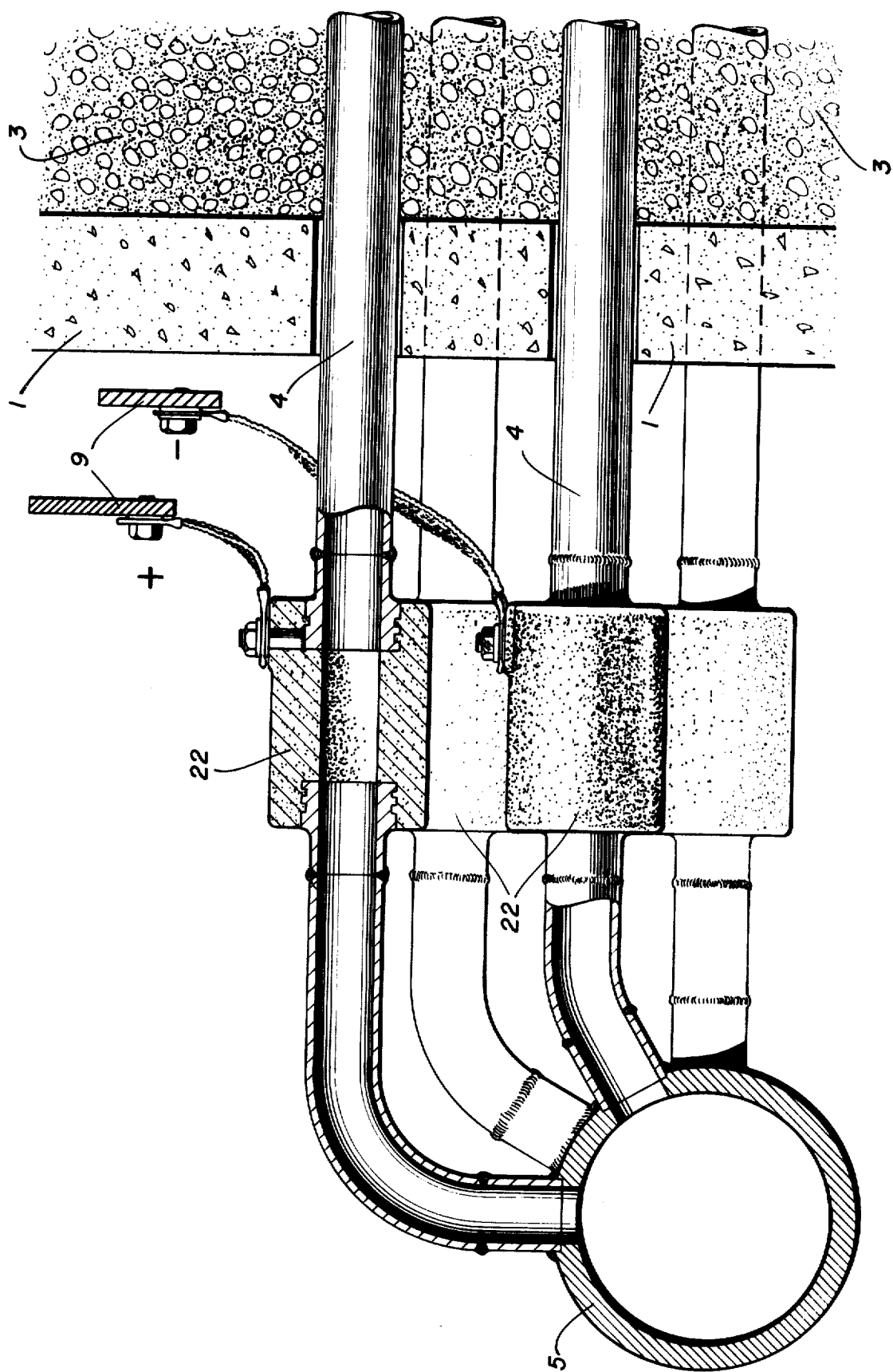
FIG. 4 shows a different electric connection to a module.

FIG. 4 illustrates a different way of conducting the electricity to the pipes 4 or 4' if present and this comprises providing bus bars 9 connecting separately to alternate pipes 4 or 4' causing them to become the electrodes. FIG. 4 also illustrates electrical insulators 22 and the way that the steam is lead into the header 5 from different vertically positioned pipes 4 and 4'.

We claim:

1. An electricity generating apparatus comprising a generator which can produce surplus electrical energy during off peak hours,
   in combination with a heat retaining magma that conducts electricity directly from said generator and being heated thereby,
   a series of passages extending through said magma and a source of water selectively entered into said passages, the water thereby being transferred into steam,
   and means receiving the steam produced by said magma to generate additional electricity to increase the total supply of electrical energy of the entire apparatus during peak demand periods,
   the material of said magma comprises an electricity conducting material throughout the aggregate, said surplus electrical energy being conducted directly to and through the aggregate.

2. The apparatus of claim 1 wherein the means receiving the steam is a supplemental generator.

3. The apparatus of claim 1 wherein the means receiving the steam includes the generator.

4. The apparatus of claim 1 wherein the magma is ceramic.

5. The apparatus of claim 1 wherein the aggregate includes concrete.

6. The apparatus of claim 1 wherein the aggregate is discrete.

7. The apparatus of claim 1 wherein the passages through the magma are spaced apart.

8. The apparatus of claim 1 wherein the passages are lined.

9. The apparatus of claim 1 wherein the passages are burnished.

10. The apparatus of claim 8 wherein the lining is porcelain.

11. The apparatus of claim 8 wherein the lining is pipe.

12. The method of conserving electrical energy in a conventional electricity generating apparatus comprising utilizing excess electricity directly to heat an electricity conducting magma heat storage device, selectively running a liquid through the magma producing steam, and conducting the steam to an electricity generator.

13. The method of claim 12 wherein the heat stored is sufficient to operate a steam turbine.

14. The method of claim 12 wherein the steam produced is superheated.

15. The apparatus of claim 1 wherein the electricity conducting material is carbon.

16. The apparatus of claim 1 wherein the magma comprises a series of blocks.

17. The apparatus of claim 16 including grooves in the blocks, said grooves being aligned to provide the passages.

* * * * *